United States Patent
Watanabe

(10) Patent No.: US 9,639,922 B2
(45) Date of Patent: May 2, 2017

(54) GENERATION METHOD OF IMAGE RESTORATION FILTER, IMAGE PROCESSING METHOD, IMAGE PICKUP APPARATUS, IMAGE PROCESSING APPARATUS, AND RECORDING MEDIUM

(71) Applicant: CANON KABUSHIKI KAISHA, Tokyo (JP)

(72) Inventor: Takeshi Watanabe, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 234 days.

(21) Appl. No.: 14/532,641

(22) Filed: Nov. 4, 2014

(65) Prior Publication Data
US 2015/0146996 A1 May 28, 2015

(30) Foreign Application Priority Data
Nov. 22, 2013 (JP) ................... 2013-241830

(51) Int. Cl.
*G06T 5/10* (2006.01)
*G06T 5/00* (2006.01)

(52) U.S. Cl.
CPC ............... *G06T 5/10* (2013.01); *G06T 5/003* (2013.01); *G06T 2207/20056* (2013.01)

(58) Field of Classification Search
CPC .................................. G06T 5/001; G06T 5/10
USPC ........................................ 382/260, 254, 275
See application file for complete search history.

(56) References Cited

U.S. PATENT DOCUMENTS

| | | | | |
|---|---|---|---|---|
| 6,728,003 B1* | 4/2004 | Gallagher | ............... | G06T 5/004 358/1.9 |
| 7,057,653 B1* | 6/2006 | Kubo | ............... | H04N 1/393 348/229.1 |
| 8,111,319 B2* | 2/2012 | Feng | ............... | G02B 27/0025 348/335 |
| 8,417,749 B1* | 4/2013 | Dick | ............... | H03H 17/0685 708/300 |
| 8,537,225 B2* | 9/2013 | Obu | ............... | H04N 5/23248 348/208.5 |
| 8,594,448 B2* | 11/2013 | Nachlieli | ............... | G06T 5/10 382/260 |
| 8,605,197 B2* | 12/2013 | Ono | ............... | G02B 3/14 348/222.1 |
| 8,659,672 B2* | 2/2014 | Hatakeyama | ............... | G06T 5/003 348/222.1 |

(Continued)

FOREIGN PATENT DOCUMENTS

JP 2011060177 A 3/2011

*Primary Examiner* — Ishrat I Sherali
(74) *Attorney, Agent, or Firm* — Rossi, Kimms & McDowell LLP

(57) ABSTRACT

A method for generating an image restoration filter used to correct a deterioration of an image captured through an optical system includes a first step of setting a target restoration gain value representative of a target restoration degree of an absolute value of an optical transfer function of the optical system, within a restoration gain limiting value calculated by dividing a maximum value operable by a fixed-point arithmetic by a data point number of the optical transfer function, and a second step of generating, through the fixed-point arithmetic, a frequency characteristic of the image restoration filter based on the target restoration gain value set by the first step.

8 Claims, 5 Drawing Sheets

(56) References Cited

U.S. PATENT DOCUMENTS

| | | | | |
|---|---|---|---|---|
| 8,792,015 B2* | 7/2014 | Hatakeyama | ............ | G06T 5/003 348/222.1 |
| 8,934,732 B2* | 1/2015 | Hatakeyama | ...... | H04N 5/23229 348/207.1 |
| 9,007,482 B2* | 4/2015 | Hatakeyama | ............ | G06T 5/003 348/222.1 |
| 2013/0038748 A1* | 2/2013 | Hatakeyama | ............ | G06T 5/003 348/222.1 |
| 2013/0050541 A1* | 2/2013 | Hatakeyama | ...... | H04N 5/23229 348/241 |

* cited by examiner

| FIG. 4A | 1-BIT CODE | 11-BIT INTEGER PART | 20-BIT DECIMAL PART |
|---|---|---|---|
| FIG. 4B | 1-BIT CODE | 9-BIT INTEGER PART | 22-BIT DECIMAL PART |
| FIG. 4C | 1-BIT CODE | 7-BIT INTEGER PART | 24-BIT DECIMAL PART |
| FIG. 4D | 1-BIT CODE | 5-BIT INTEGER PART | 26-BIT DECIMAL PART |

GENERATION METHOD OF IMAGE RESTORATION FILTER, IMAGE PROCESSING METHOD, IMAGE PICKUP APPARATUS, IMAGE PROCESSING APPARATUS, AND RECORDING MEDIUM

BACKGROUND OF THE INVENTION

Field of the Invention

The present invention relates to image processing for an image restoration.

Description of the Related Art

Since an image captured through an image pickup optical system may blur and deteriorate due to influence of aberrations of the image pickup optical system, etc., an image restoration is conventionally applied so as to correct the deterioration. The image restoration can be executed with a software operation or a hardware operation. The software operation generally requires a personal computer ("PC") and thus the hardware operation is advantageous to the image restoration in an image pickup apparatus.

The hardware operation relies on an integer operation, and the number of digits is set to 16 or 32 bits, or the like, which can be processed. The image restoration also use a plus or minus code and a decimal value. For example, the first bit is configured to express a plus or minus code, and the fixed-point arithmetic is used to fix a position of the decimal point between the integer part and the decimal part. The calculation that exceeds the digits of the integer part results in an overflow. The overflow is likely to occur in the inverse Fourier transform in generating an image restoration filter.

Japanese Patent Laid-Open No. ("JP") 2011-60177 discloses a fast Fourier transform ("FFT") operating unit having a plurality of operating parts for an FFT with the fixed-point arithmetic having a fixed bit length. This FFT operating unit provides a bit shift to at least one operating data of the operating part, and at least one operating part serves to detect its overflow. The FFT operating unit adjusts a bit shift amount when the overflow is detected by the operation part.

However, the method of JP 2011-60177 changes a bit assignment of the decimal part in the calculation and cannot guarantee the desired calculation precision.

SUMMARY OF THE INVENTION

The present invention provides an image processing method, image pickup apparatus, and image processing apparatus, each of which can maintain image restoration precision and prevent an overflow.

A method according to the present invention for generating an image restoration filter used to correct a deterioration of an image captured through an optical system includes a first step of setting a target restoration gain value representative of a target restoration degree of an absolute value of an optical transfer function of the optical system, within a restoration gain limiting value calculated by dividing a maximum value operable by a fixed-point arithmetic by a data point number of the optical transfer function, and a second step of generating, through the fixed-point arithmetic, a frequency characteristic of the image restoration filter based on the target restoration gain value set by the first step.

Further features of the present invention will become apparent from the following description of exemplary embodiments with reference to the attached drawings.

BRIEF DESCRIPTION OF THE DRAWINGS

FIGS. 4A-4D are views of illustrative bit number assignment in a frequency converter according to the first and second embodiments of the present invention.

DESCRIPTION OF THE EMBODIMENTS

Figure 1:
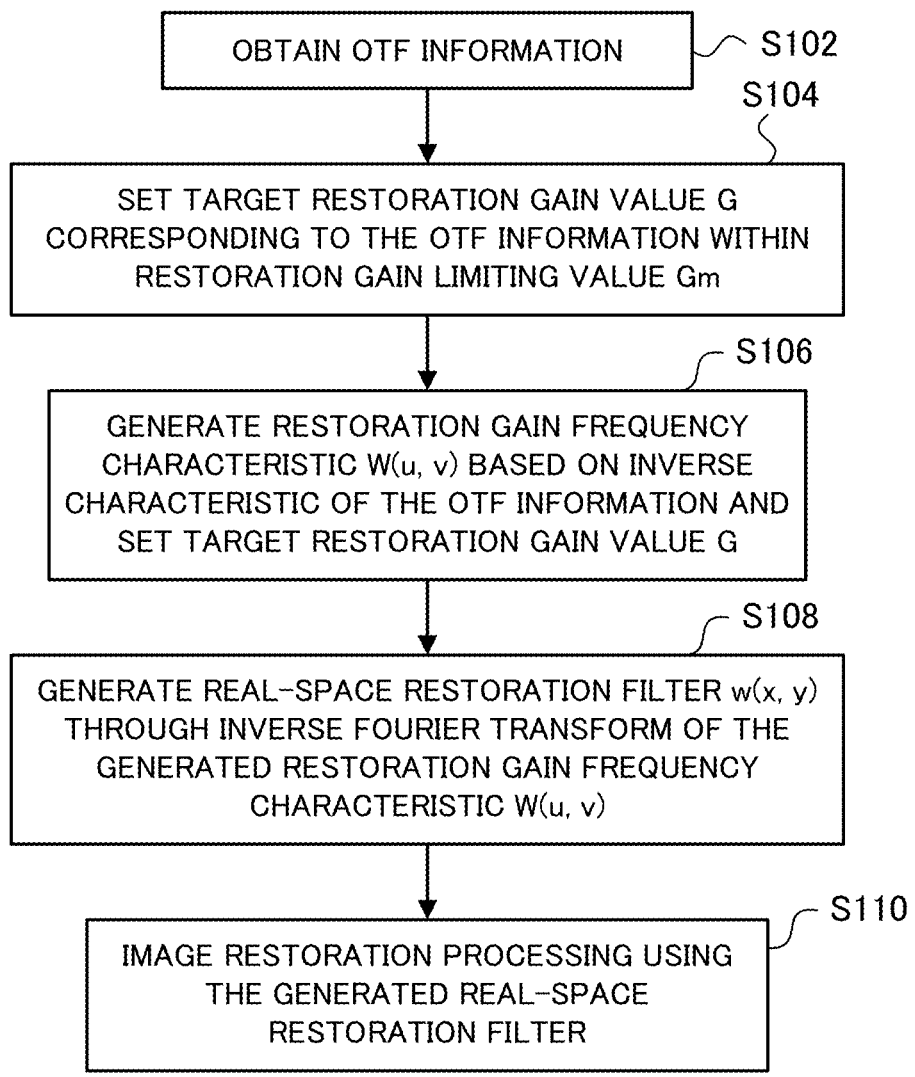
FIG. 1 is a flowchart of image restoration processing according to first and second embodiments of the present invention.

Due to influence of the diffraction and aberration generated in the image pickup optical system, light generated from one point does not converge on one point, and has a small spread, which is referred to as a point spread function ("PSF"). As a result, the image captured via the image pickup optical system blurs and the resolution deteriorates. The conventional image restoration corrects the deterioration of the image as follows:

The following expression is satisfied in a real space (x, y), where f(x, y) is an image that has not yet been deteriorated by the image pickup optical system, h(x, y) is a PSF, and g(x, y) is a deteriorated image.

$$g(x,y)=\iint f(X,Y)*h(x-X,y-Y)dXdY \quad (1)$$

The following expression is obtained by performing a Fourier transform for the expression (1) so as to convert it from the real space (x, y) to a frequency space (u, v).

$$G(u,v)=F(u,v)*H(u,v) \quad (2)$$

Herein, F(u, v) is a Fourier transform of f(x, y), G(u, v) is a Fourier transform of g(x, y), and H(u, v) is a Fourier transform of h(x, y). The expression (2) can be modified into the following expression:

$$F(u,v)=G(u,v)/H(u,v) \quad (3)$$

This means that when the Fourier transform G(u, v) of the deteriorated image g(x, y) is divided by the Fourier transform H(u, v) of the PSF h(x, y), the Fourier transform F(u, v) of the pre-deterioration image f(x, y) can be obtained. Hence, when the inverse Fourier transform is performed for F(u, v), the pre-deterioration image f(x, y) can be obtained.

However, this image restoration remarkably amplifies noises that may occur in the image sensor, and may cause ringing in the image. A dividing method using a simple inverse characteristic has a difficulty of obtaining an excellent image.

Accordingly, it is conventionally proposed to use of a Wiener filter (restoration gain frequency characteristic) W(u, v) expressed by the expression (4) as the image restoration method of restraining the noise amplification. Herein, H(u, v) is an optical transfer function ("OTF"), and Γ is a constant used to reduce a noise amplification amount. Even when a target image has no noises at all, ringing and edge digging may occur when the amplification factor becomes excessively high. It is therefore important to control Γ, and Γ is used as an adjustment term of controlling the amplification factor. Instead of treating Γ as a constant, Γ(u, v) may be treated as an adjustment term that depends upon the frequency characteristic.

$$W(u,v)=1/H(u,v)*|H(u,v)|^2/(|H(u,v)|^2+\Gamma) \quad (4)$$

When the expression (4) is multiplied by the Fourier transform G(u, v) of the deteriorated image g(x, y), the phase component of the PSF generated by the refraction and the aberration of the optical system can be eliminated, and a high-resolution and excellent image can be obtained by amplifying the frequency characteristic of the amplitude component. In other words, the following expression can be obtained where R(u, v) is frequency space information of an image restored by the image restoration processing using the Wiener filter. The frequency characteristic of the image restoration filter utilizes a reciprocal (inverse characteristic) of the OTF.

$$R(u,v)=G(u,v)*W(u,v) \quad (5)$$

W(u, v) is referred to as a restoration gain frequency characteristic, and Γ is referred to as a restoration gain adjustment term. The expression (5) is restoration processing in the frequency space, which is equivalent to a convolution of a shift invariant filter with a target region in the real space.

This restoration processing can maintain the precision when the aberration is well-corrected in the entire image height range or in a region in which an aberrational characteristic is less likely to change. However, this is not the case in an image pickup optical system for a digital camera, etc., because its aberrational fluctuation is considerable in the entire image height range and the vignetting significantly fluctuates according to the image height position.

It is thus necessary that the restoration gain frequency characteristic W(u, v) is converted into a value in a real space for each image height, and that the value is convoluted as the real-space image restoration filter w(x, y) for each image height. At this time, the real-space image restoration filter w(x, y) is generated at representative points of the image height and the processing load may be reduced, for example, by using an interpolation of the representative points.

It is important for a method pursuant to the Wiener filter based on the inverse characteristic of the OTF to control the restoration gain adjustment term Γ in the expression (4). As the restoration gain adjustment term Γ increases, the restoration gain frequency characteristic W(u, v) becomes lower, and as the restoration gain adjustment term Γ decreases, the restoration gain frequency characteristic W(u, v) becomes larger.

The restoration gain frequency characteristic W(u, v) is designed by considering the foregoing, and the real-space image restoration filter w(x, y) is obtained by performing the inverse Fourier transform for the restoration gain frequency characteristic W(u, v) in the actual image restoration processing.

It is therefore necessary for the image restoration processing using a conversion to control a bit assignment to an integer part and a decimal part of each of the Fourier-transformed data and inverse-Fourier-transformed data so that the Fourier-transformed data and inverse-Fourier-transformed data do not overflow.

Initially, the Fourier transform pair is defined as follows in a discrete Fourier transform.

$$F(u, v) = \sum\sum f(x, y)\exp\left\{-j2\pi\left(\frac{ux}{M} + \frac{vy}{N}\right)\right\} \quad (6)$$

$$f(x, y) = \frac{1}{MN}\sum\sum F(u, v)\exp\left\{j2\pi\left(\frac{ux}{M} + \frac{vy}{N}\right)\right\} \quad (7)$$

∵ x = 0 ~ M − 1,
y = 0 ~ N − 1,
u = 0 ~ M − 1,
v = 0 ~ N − 1

The expression (6) indicates a Fourier transform, and the expression (7) indicates an inverse Fourier transform. The inverse Fourier transform may not be scaled with 1/(MN). In each expression, the "exp" part will be referred to as a rotation factor. A code of the rotation factor may be inverted depending on the definition, but is sufficient as long as it is established as a Fourier transform pair. Each of M and N is the tap numbers in each dimension of the two-dimensional data, and a product MN of M and N is referred to as a data point number.

The inverse Fourier transform in the expression (7) is used to generate a real-space image restoration filter w(x, y). F(u, v) corresponds to a restoration gain frequency characteristic, and f(x, y) corresponds to a real-space image restoration filter. A description will be given of a method of estimating a maximum value of f(x, y) based on F(u, v). For simplicity purposes, one-dimensional Fourier transform of F(u) and f(x) will be used.

Herein, $a_m$ and $b_m$ are values of the real part and imaginary part of the restoration gain characteristic, $\delta_m$ is a Kronecker's delta, and j is an imaginary unit.

$$F(u)=\Sigma(a_m+jb_m)\delta_{um} \quad (8)$$

The following expressions are satisfied when F(u) is set as in the expression (8).

$$f(x) = \frac{1}{M}\sum\sum (a_m + jb_m)\delta_{um}\exp\left\{j2\pi\left(\frac{ux}{M}\right)\right\} \quad (9)$$

$$f(x) = \frac{1}{M}\sum (a_m + jb_m)\exp\left\{j2\pi\left(\frac{mx}{M}\right)\right\} \quad (10)$$

The following expression is satisfied with a triangle inequality.

$$|f(x)| = \left|\frac{1}{M}\sum (a_m + jb_m)\exp\left\{j2\pi\left(\frac{mx}{M}\right)\right\}\right| \leq \frac{1}{M}\sum |(a_m + jb_m)| \quad (11)$$

Therefore, the following expression is established.

$$|f(x)| \leq \frac{1}{M}\sum |(a_m + jb_m)| \quad (12)$$

The frequency converter can store a maximum value of $\Sigma|a_m+jb_m|$ and it is necessary to secure a decimal bit number for the desired calculation precision and 1 bit as a code bit. Alternatively, $a_m$ and $b_m$ are controlled so that $\Sigma|a_m+jb_m|$ can be smaller than the bit number calculated by subtracting 1 bit as the code bit and the decimal bit number from the secured overall bit number.

FIG. 1 is a flowchart of a simple procedural flow of image restoration processing (image processing method) executed by an image processing apparatus according to this embodiment, and "S" stands for the step. S102 to S108 also serve as a method for generating an image restoration filter.

Initially, optical transfer function information (OTF information) is obtained (S102). The OTF information depends upon an image pickup condition, such as a focal length of the image-optical system, an F-number, and an image pickup distance. A plurality of pieces of OTF information may be obtained for each image height in a (captured) image.

Next, the target restoration gain value G corresponding to the OTF information is set within the restoration gain limiting value Gm (first step S104). The target restoration gain value G is an index representing the restoration strength (target restoration degree of the MTF as an absolute value of the OTF). As the target restoration gain value G increases, a more deteriorated image can be restored, but a data amount of the image restoration filter increases and is more likely to cause an overflow. Accordingly, this embodiment sets an upper limit of G to Gm, and prevents the overflow. The target restoration gain G is set to the restoration gain limiting value Gm or smaller. A description will be given of a setting method of Gm.

Next, the restoration gain frequency characteristic W(u, v) expressed in the expression (4) is generated based on the inverse characteristic of the OTF information and the set target restoration gain value G (second step S106). The expression (4) is used to generate the restoration gain frequency characteristic W(u, v) by controlling the restoration gain adjustment term $\Gamma$ relative to the target restoration gain value G.

Next, an inverse Fourier transform is performed for the generated restoration gain frequency characteristic W(u, v), and a real-space image restoration filter w(x, y) is generated (S108). The restoration processing is executed (third step S110) by convoluting the real-space image restoration filter w(x, y) with the target image.

Figure 2:
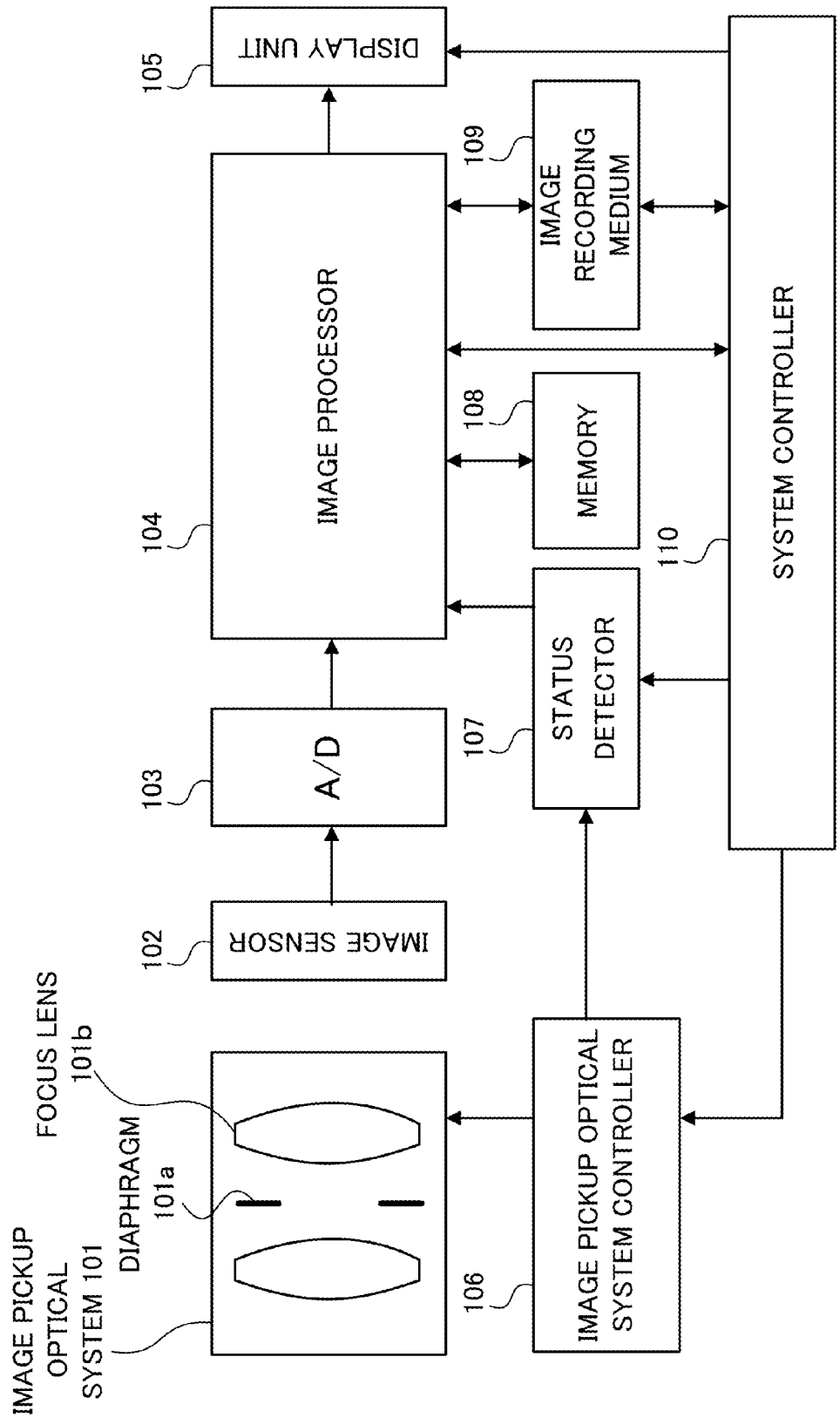
FIG. 2 is a block diagram of an image pickup apparatus for executing the image restoration processing illustrated in FIG. 1 according to the first and second embodiments.

FIG. 2 is a block diagram of an image pickup apparatus that includes an image processor configured to execute the above image processing method. An image pickup optical system 101 that includes a diaphragm 101a and a focus lens 101b is exchangeably attached to an image pickup apparatus. The image pickup optical system forms an optical image of an object. The diaphragm 101a adjust a light quantity incident upon an image sensor 102. The focus lens 101b is moved in the optical axis direction for focusing.

The present invention is not limited to this embodiment, and is applicable to an image pickup apparatus integrated with the image pickup optical system. An image obtained via the image pickup optical system 101 is photoelectrically converted into an analog signal by the image sensor 102, and converted into a digital signal by the A/D converter 103.

An image processor 104 performs image processing for this digital signal utilizing information from a status detector 107 and a memory 108, and generates image information.

The image processor 104 includes an image restoration processing circuit configured to provide an image restoration utilizing a hardware operation illustrated in FIG. 1. Thereby, the image processing can be provided in the image pickup apparatus.

In this case, the OTF information may be stored in a memory (not illustrated) of the interchangeable lens and obtained through an image pickup optical system controller 106 as a lens controller. Alternatively, the memory 108 in the camera body stores the OTF information and a system controller 110 obtains identification ("ID") information from the image pickup optical system controller 106 and pickup up the OTF information corresponding to the ID information. The OTF depends upon the image pickup condition, and the image pickup condition information obtained by the status detector 107 may also be stored in the memory 108. The memory 108 may store information of image restoration filter, information of the above expressions, and the program and variables necessary for the image restoration.

The system controller 110 serves as a camera controller configured to control each component, such as the image processor 104, a display unit 105, the image pickup optical system controller 106, the status detector 107, and the image recording medium 109. The system controller 110 is configured as a microcomputer, etc. The image pickup optical system controller 106 controls an operation of the image pickup optical system 101, and the status detector 107 detects a status of the image pickup optical system 101 based upon information from the image pickup optical system controller 106. The system controller 110 provides a determination, setting, decision, etc. in the image restoration, which will be described later. For example, the system controller 110 determines whether the input target restoration gain value G exceeds the restoration gain limiting value Gm, and sets the target restoration gain value G to the memory 108 when it does not exceed the restoration gain limiting value Gm. In first and second embodiment, which will be described later, the system controller 110 determines whether the average value of the absolution values or the maximum value of the absolute values of the frequency characteristic of the image restoration filter falls within a permissible range from the target restoration gain value G.

The image restoration of this embodiment may be executed in a dedicated image processing apparatus or a PC.

The image processor configured to execute the image processing method according to this embodiment operates with the fixed-point arithmetic and thus can provide a processing speed much higher than that of the software operation. However, the image processor has a risk of the overflow and insufficient calculation precision in the operation due to the fixed-point arithmetic. In order to overcome these problems, the restoration gain limiting value Gm is used.

According to this embodiment, the frequency converter configured to provide a Fourier transform and an inverse Fourier transform in the fixed-point arithmetic sets, to the restoration gain limiting value Gm, a value calculated by dividing the maximum value operable in the fixed-point arithmetic by the data point number.

An image restoration filter for a two-dimensional image is generally a two-dimensional filter having taps (cells) corresponding to respective pixels of the image, and the restoration precision generally improves as the number of taps (or cells) increases. Therefore, the feasible tap number is set in accordance with the required image quality, the image processing capability, and the aberrational characteristic, etc. The image restoration filter reflects at least the aberrational characteristic, and is different from the edge enhancement filter (high-pass filter) or the like. The image restoration filter is set based on a reciprocal of the OTF, and configured to highly precisely correct deteriorations of both the amplitude component and the phase component.

An actual image contains a noise component, and the image restoration filter produced based on a reciprocal of the OTF would amplify the noise component in restoring the deteriorated image. This is because the MTF (amplitude component: modulation transfer function) as an absolute value of the OTF of the optical system is restored so that the MTF returns to 1 over the entire frequency range. The MTF as an amplitude deterioration in the optical system can be restored to 1 but the noise power spectrum is also heaved and consequently amplified according to the restoration degree (or gain) of the MTF.

A description will now be given of a control method of preventing the target restoration gain value G set by the user of the image restoration system from exceeding the restoration gain limiting value Gm. The target restoration gain value G provides a rough estimate of the corrective strength of the image restoration.

Next follows a description with each of an average value $(1/MN)\Sigma\Sigma|W(u,v)|$ of the absolute value at each frequency position of the restoration gain frequency characteristic W(u, v), which will be referred to as an "average restoration gain value" hereinafter, and a maximum absolute value max{W(u, v)}, which will be referred to as a "maximum restoration gain value" hereinafter. A description will now be given of the target restoration gain value G that is set to the average restoration gain value.

The target restoration gain value G is set to a value equal to or smaller than the restoration gain limiting value Gm, and corresponds to the restoration gain characteristic W(u, v) in the frequency space. In this embodiment, the target restoration gain value G is arbitrarily set by the user, and the restoration gain limiting value Gm is set by the system controller 110. The restoration gain limiting value Gm may be displayed on the display unit 105. When the user inputs the target restoration gain value G that exceeds the restoration gain limiting value Gm, a reentry is prompted with a warning that the setting is invalid or the restoration gain limiting value Gm may be automatically set as the target restoration gain value G.

Figure 3A:
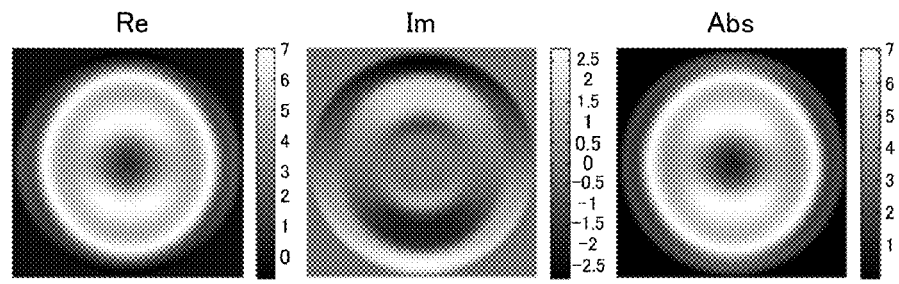
FIGS. 3A-3C are views of illustrative frequency characteristics based on an inverse characteristic of an optical transfer function in the image restoration processing according to the first and second embodiments of the present invention.
Figure 3B:
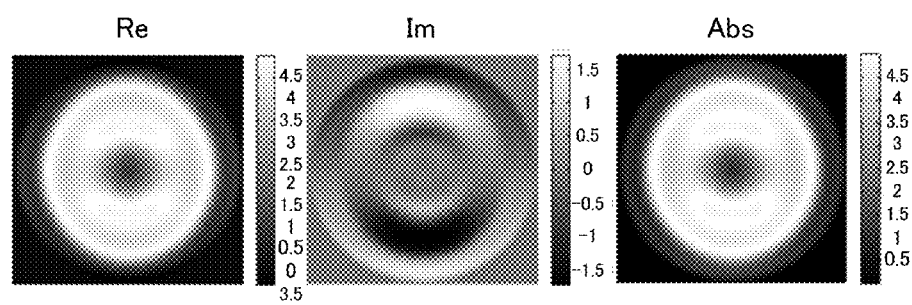
Figure 3C:
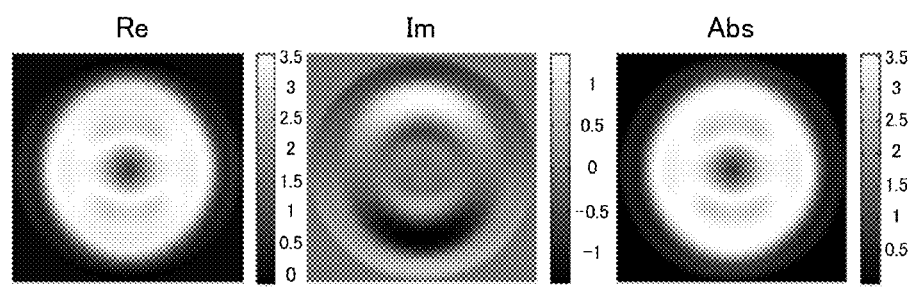

FIG. 3A illustrates a restoration gain characteristic when the restoration gain adjustment term $\Gamma$ has a value of 0.005. FIG. 3B illustrates a restoration gain characteristic when the restoration gain adjustment term $\Gamma$ has a value of 0.01. FIG. 3C illustrates a restoration gain characteristic when the restoration gain adjustment term $\Gamma$ has a value of 0.02. Herein, Re, Im, and Abs denote a real part, an imaginary part, and an absolute value of the restoration gain frequency characteristic W(u, v).

According to the expression (4), the value of the restoration gain adjustment value $\Gamma$ that provides a desired value to $(1/MN)\Sigma\Sigma|W(u,v)|$ cannot be easily calculated. Thus, a certain initial value $\Gamma 0$ is provided to the restoration gain adjustment term $\Gamma$, and $(1/MN)\Sigma\Sigma|W(u,v)|$ at that time is calculated. When the end condition is not satisfied, $(1/MN)\Sigma\Sigma|W(u,v)|$ is converged on a desired value by slightly changing the restoration gain adjustment term $\Gamma$ from $\Gamma 0$ to $\Gamma 1$. The restoration gain frequency characteristic W(u, v) is complex data, and $W(u,v)=Re\{W(u,v)\}+jIm\{W(u,v)\}$ is satisfied.

FIG. 3A illustrates Re{W(u, v)}, Im{W(u, v)}, and |W(u, v)| when the restoration gain adjustment term $\Gamma=0.005$. FIG. 3B illustrates Re{W(u, v)}, Im{W(u, v)}, and |W(u, v)| when the restoration gain adjustment term $\Gamma=0.01$. FIG. 3C illustrates Re{W(u, v)}, Im{W(u, v)}, and |W(u, v)| when the restoration gain adjustment term $\Gamma=0.02$.

Initially, $W(u,v)=Re\{W(u,v)\}+jIm\{W(u,v)\}$ is calculated and the absolute value |W(u,v)| is generated. $(1/MN)\Sigma\Sigma|W(u,v)|$ is 3.38, 2.43, and 1.66 in FIGS. 3A to 3C, respectively.

In other words, when $\Gamma$ is changed in order of 0.005, 0.01, and 0.02 in the expression (4), the average restoration gain value changes in order of 3.38, 2.43, and 1.66. When the target restoration gain value G is 2.00, the restoration gain adjustment term $\Gamma$ converges on a value between 0.01 and 0.02, and when the target restoration gain value G is 1.50, the restoration gain adjustment term $\Gamma$ converges on a value larger than 0.02.

Next follows a description when the target restoration gain value G is set to the maximum restoration gain value. The evaluation method is similar, and a detailed description thereof will be omitted. However, whether max{|W(u,v)|} is converged is determined for the maximum restoration gain value. In the examples of FIGS. 3A-3C, max{|W(u,v)|} is 7.07, 5.00, and 3.54, respectively.

In the image restoration according to this embodiment, the bit number of the frequency converter configured to provide the Fourier transform and the inverse Fourier transform is set to 32 bits.

FIGS. 4A to 4D illustrate illustrative bit number arrangements to the code part, the integer part, and the decimal part in the frequency converter according to the present invention. In the 32-bit operation, one bit is assigned to the code part commonly to FIGS. 4A-4D. When 11, 9, 7, and 5 bits are assigned to the integer part, 20, 22, 24, and 26 bits are assigned to the decimal part. Actually, at least one extra bit can be secured due to rounding in the fixed-point arithmetic.

The integer part significantly affects the dynamic range of the distribution of the restoration gain frequency characteristic W(u, v), and the decimal part significantly affects the precision of the restoration gain frequency characteristic W(u, v) and the precisions of the Fourier transform and the inverse Fourier transform. In other words, when the dynamic range of the restoration gain frequency characteristic W(u, v) is made wider, the precision deteriorates, and when the precisions of the restoration gain frequency characteristic W, the Fourier transform, and the inverse Fourier transform are improved, the dynamic range becomes narrower.

When 32 bits are assigned as illustrated in FIG. 4A, the product of F(u, v) in the expression (7) and the rotation factor can express at least $1/2^{20}$, and three to four digits below the decimal point are assigned to F(u, v) and three to four digits are assigned to the rotation factors corresponding to sin and cos.

In this assignment, the image restoration precision reduces, the restoration gain limiting value Gm increases since the $2^{11}$ bits are assigned to the integer part. However, it is practically useless in most cases to assign $2^{11}$ bits to the integer part. It is therefore sufficient, as illustrated in FIGS. 4B and 4C, to secure about 7 to 9 bits for the integer part. Thereby, more bits can be assigned to the restoration gain frequency characteristic W(u, v) and the rotation factor, and thus the operation of the image restoration system becomes stable.

On the other hand, as illustrated in FIG. 4D, when the integer part is reduced down to about 5 bits, the bit number of decimal part becomes 26 bits and the operating precision improves but the integer part has only 5 bits. Therefore, a theoretical limit is the restoration processing using a 32-tap restoration filter even with the idle generated from the numerical rounding in the operation, and the real-space image restoration filter w(x, y) is generated with a strength of an average restoration gain of smaller than 2.

In the image restoration filter generating step operated with the fixed-point arithmetic, the integer part has a maximum value and the overflow is likely to occur in the inverse Fourier transform from the restoration gain frequency characteristic W(u, v) to the real-space image restoration filter w(x, y). The maximum value at this time becomes $\Sigma\Sigma|a_m+jb_m|$ that is a sum of respective absolute values of the restoration gain frequency characteristic W(u, v). Therefore, the overflow never happens when the maximum value of the frequency converter can be $\Sigma\Sigma|a_m+jb_m|$ and the restoration gain limit is made equal to or smaller than an average value of $1/(MN)\Sigma\Sigma|a_m+jb_m|$.

Due to the bit number assignment that compromises the dynamic range with the operating precision and the maximum value of the available dynamic range that is set to the restoration gain limiting value Gm, the strength of the image restoration processing and the image restoration precision can be maintained with a fewer bit number.

First Embodiment

Initially, the restoration gain limiting value Gm is set in advance to the image restoration processing, and the maximum bit number, such as 32 bits, which can be maintained in the frequency converter is set. This is determined in the feasible circuit mounting scale with the balance of other circuits and the cost. Thereafter, the number of bits is assigned to the code part, the integer part, and the decimal part according to the necessary effect and precision in the image restoration system, as illustrated in FIG. 4B, for example. Thereby, the available maximum value in the image restoration system is determined. The restoration gain limiting value Gm is set to a value made by dividing this maximum value by the data point number. The restoration gain limiting value Gm is stored in the image restoration system.

In general, the more the tap number (the cell number) of the image restoration filter is, the restoration precision improves. Therefore, the feasible tap number is set according to the required image quality, the image processing capability, and the aberrational characteristic, etc. This is true of the second embodiment.

Figure 5:
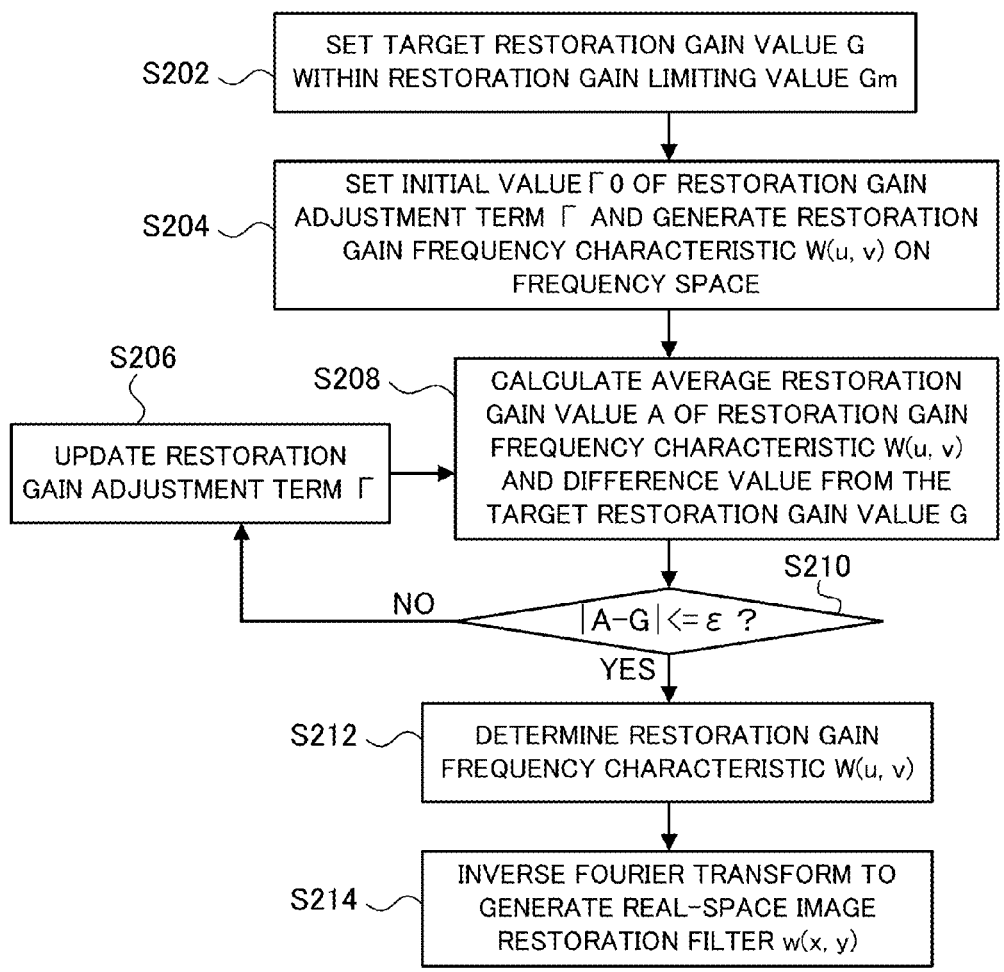
FIG. 5 is a flowchart of the image restoration processing according to the first embodiment of the present invention.

FIG. 5 is a flowchart of generating the real-space image restoration filter w(x, y) according to the first embodiment. As described above, the user arbitrarily sets the image restoration strength (the target restoration gain value G). The target restoration gain value G is set within the restoration gain limiting value Gm (S202). The settable range may be limited by the restoration gain limiting value Gm or the target restoration gain value G equal to or larger than the restoration gain limiting value Gm may be clipped.

Next, the initial value Γ0 of the restoration gain adjustment term Γ is input into the expression (4) (S204). When the initial value Γ0 is excessively small, the restoration gain characteristic is overflowed and thus a slightly larger value is set. Then, the restoration gain adjustment term Γ is updated. An updating variation amount of the restoration gain adjustment term Γ may be sequentially changed and converged. Assume that $A=(1/MN)\Sigma\Sigma|W(u,v)|$ is defined as an average restoration gain of the restoration gain frequency characteristic W(u, v). Whenever the gain adjustment term Γ is updated (S206), the average restoration gain A is calculated (S208). When the average restoration gain A falls in a permissible range of ±ϵ from the target restoration gain G (S210), updating of the restoration gain adjustment term Γ ends.

The real-space image restoration filter w(x, y) is generated (S214) through an inverse Fourier transform of the restoration gain frequency characteristic W(u, v) generated using the final restoration gain adjustment term Γ (S212). An image is corrected with the generated real-space image restoration filter w(x, y) and the corrected image is output.

Second Embodiment

Figure 6:
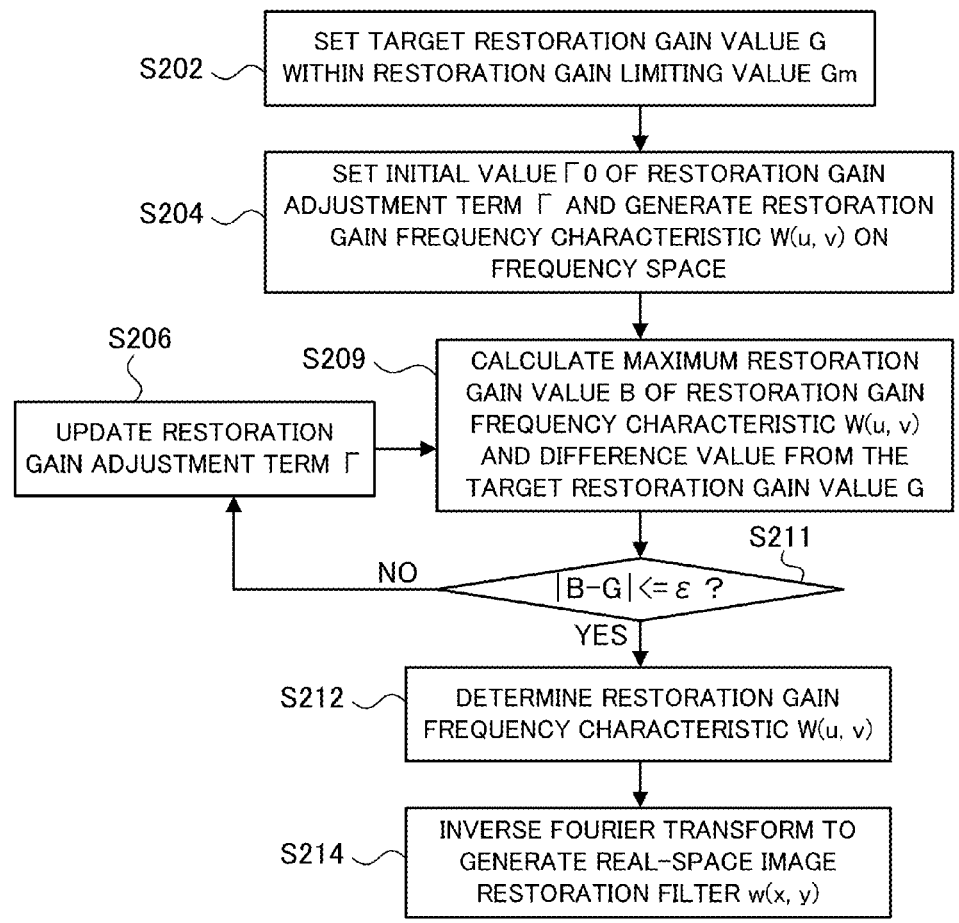
FIG. 6 is a flowchart of the image restoration processing according to the second embodiment of the present invention.

FIG. 6 is a flowchart of generating a real-space image restoration filter w(x, y) according to a second embodiment. Those steps in FIG. 6, which are the corresponding steps in FIG. 5, are designated by the same reference numerals. After S202 and S204, the maximum restoration gain value of the restoration gain frequency characteristic W(u, v) is set to $B=\max\{|W(u,v)|\}$, and whenever the restoration gain adjustment term Γ is updated (S206), the maximum restoration gain B is calculated (S209). When the maximum restoration gain B falls in a permissible range of ±ϵ form the target restoration gain G (S211), updating of the restoration gain adjustment term Γ ends.

Herein, ϵ may be arbitrarily set but an excessively small value may cause a failure of the convergence and an infinite loop. Therefore, the ending determination using the number of repetitions may also be employed. Finally, the solid-space image restoration filter w(x, y) is generated (S214) through an inverse Fourier transform of the restoration gain frequency characteristic W(u, v) (S212) for which updating of the restoration gain adjustment term Γ ends. An image is corrected with the generated real-space image restoration filter w(x, y) and the corrected image is output.

In converging the restoration gain frequency characteristic W(u, v) using the maximum restoration gain B, the average restoration gain is necessarily equal to or smaller than the maximum restoration gain B. Therefore, it is unnecessary to monitor the average restoration gain, and mounting becomes advantageously simpler.

Each embodiment thus can provide an image processing method, an image pickup apparatus, and an image processing apparatus, each of which can maintain the image restoration precision and prevent an overflow.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-241830, filed Nov. 22, 2013, which is hereby incorporated by reference herein in its entirety.

What is claimed is:

1. A computer-implemented image processing method for correcting a deterioration of an image captured through an optical system using an image restoration filter (W) comprising:
   a step of calculating, through a fixed-point arithmetic, a frequency characteristic of the image restoration filter (W) so that a restoration gain value is set within a restoration gain limiting value (Gm) calculated based on a maximum value operable through the fixed-point arithmetic,
   a step of generating the image restoration filter (W) through a Fourier conversion of the frequency characteristic of the image restoration filter (W), and
   a step of correcting the deterioration of the image by applying the image restoration filter (W) to the image,
   wherein the restoration gain limiting value (Gm) is calculated by dividing a maximum value operable through the fixed-point arithmetic by a data point number of the image restoration filter (W).

2. The method according to claim 1, wherein the frequency characteristic of the image restoration filter is calculated so that the restoration gain value is equal to or smaller than an average value of absolute values of the frequency characteristic of the image restoration filter.

3. The method according to claim 2, wherein Γ expressed by the following expression is updated so that the restoration gain value is equal to or smaller than the average value of the absolute values, where W(u, v) is the frequency characteristic, and H(u, v) is an optical transfer function of the optical system:

$$W(u,v)=1/H(u,v)* |H(u,v)|2/(|H(u,v)|2\Gamma).$$

4. The method according to claim 1, wherein when a target restoration gain value exceeding the restoration gain limiting value is input, the target restoration gain value is set to the restoration gain limiting value.

5. The method according to claim 1, wherein when a target restoration gain value exceeding the restoration gain limiting value is input, a warning is provided and a reentry of the target restoration gain value is prompted.

6. An image processing apparatus configured to correct a deterioration of an image captured through an optical system using an image restoration filter (W), the image processing apparatus comprising:
- a controller configured to calculate, through a fixed-point arithmetic, a frequency characteristic of the image restoration filter (W) so that a restoration gain value is set within a restoration gain limiting value (Gm) calculated based on a maximum value operable through the fixed-point arithmetic, and to generate the image restoration filter (W) through a Fourier conversion of the frequency characteristic of the image restoration filter (W); and
- an image processor configured to correct the deterioration of the image by applying the image restoration filter (W) to the image,
- wherein the restoration gain limiting value (Gm) is calculated by dividing a maximum value operable through the fixed-point arithmetic by a data point number of the image restoration filter (W).

7. An image pickup apparatus comprising:
- an image sensor configured to capture an image formed by an optical system;
- an image processor configured to correct a deterioration of the image by applying an image restoration filter (W); and
- a controller configured to calculate, through a fixed-point arithmetic, a frequency characteristic of the image restoration filter (W) so that a restoration gain value is set within a restoration gain limiting value (Gm) calculated based on a maximum value operable through the fixed-point arithmetic, and to generate the image restoration filter (W) through a Fourier conversion of the frequency characteristic of the image restoration filter (W),
- wherein the restoration gain limiting value (Gm) is calculated by dividing a maximum value operable through the fixed-point arithmetic by a data point number of the image restoration filter (W).

8. A non-transitory computer-readable medium storing a program executable by a computer to execute an image processing method for correcting a deterioration of an image captured through an optical system using an image restoration filter (W), the image processing method comprising:
- a step of calculating, through a fixed-point arithmetic, a frequency characteristic of the image restoration filter (W) so that a restoration gain value is set within a restoration gain limiting value (Gm) calculated based on a maximum value operable through the fixed-point arithmetic,
- a step of generating the image restoration filter (W) through a Fourier conversion of the frequency characteristic of the image restoration filter (W), and
- a step of correcting the deterioration of the image by applying the image restoration filter (W) to the image,
- wherein the restoration gain limiting value (Gm) is calculated by dividing a maximum value operable through the fixed-point arithmetic by a data point number of the image restoration filter (W).

* * * * *